United States Patent

Palfreyman

[15] 3,653,612
[45] Apr. 4, 1972

[54] CONTROL WHEEL FORCE SENSOR DEVICE

[72] Inventor: Raymond D. Palfreyman, Clifton, N.J.

[73] Assignee: The Bendix Corporation

[22] Filed: Sept. 21, 1970

[21] Appl. No.: 73,940

[52] U.S. Cl. ..........................................244/83 E
[51] Int. Cl. ..........................................B64c 13/04
[58] Field of Search..................244/83, 76, 77, 75, 84

[56] References Cited

UNITED STATES PATENTS

| | | | |
|---|---|---|---|
| 3,043,539 | 6/1962 | Bishop | 244/76 R |
| 3,060,362 | 10/1962 | Redmond et al. | 244/77 R X |
| 3,368,351 | 2/1968 | Wood et al. | 244/76 R X |

Primary Examiner—Milton Buchler
Assistant Examiner—Carl A. Rutledge
Attorney—Herbert L. Davis and Plante, Hartz, Smith, and Thompson

[57] ABSTRACT

A control wheel force sensor device including a control element having spring members orthogonal to one another and each spring member mounting semiconductor strain gauges to provide signals corresponding to the flexure of the associated spring member. The control element has an end portion affixed interiorly to a base member carried by the control wheel, while an opposite free end portion of the control element provides an inner bearing surface operably positioned in a nutational bearing mounted in an inner hub portion on which the control wheel may be angularly and linearly positioned. In the nutational bearing, supporting means carrying a single ball or row of bearing balls is so arranged as to permit linear motion of the free end inner bearing surface portion of the control element in relation to the single ball or the bearing balls and a nutating motion of such free end inner bearing portion of the control element in relation to the ball or balls carried by the supporting means. Such linear and nutating motion of the free end inner bearing portion of the control element upon operation of the control wheel permits a corresponding flexure of the associated spring member of the control element by the control wheel in effecting control of an aircraft in pitch and roll sense. The strain gages on such orthogonal spring member may be connected in an electrical bridge circuit so as to differentially unbalance the bridge and provide an electrical output corresponding to the forces applied to the spring member in said pitch and roll senses to modify an automatic pilot control system.

16 Claims, 7 Drawing Figures

INVENTOR.
RAYMOND DONALD PALFREYMAN

INVENTOR.
RAYMOND DONALD PALFREYMAN

INVENTOR.
RAYMOND DONALD PALFREYMAN
BY Herbert L. Davis

ATTORNEY

INVENTOR.
RAYMOND DONALD PALFREYMAN
BY Herbert L. Davis
ATTORNEY

CONTROL WHEEL FORCE SENSOR DEVICE

BACKGROUND OF THE INVENTION

1. Field of the Invention

This invention relates to the aircraft control field and more particularly to a control wheel force transducer means for sensing the flexure of a control wheel in pitch and roll senses to modify an automatic pilot control system for the aircraft.

2. Description of the Prior Art

Heretofore, control sticks and E" wheels for manually controlling aircraft have used synchros, "E" pick offs or movable core transformers for detecting displacement of the control stick or control wheel as disclosed and claimed in U.S. Reissue Pat. No. 25,356 granted Mar. 19, 1963 to Robert E. Feucht, John Jarvis and John C. Ziegler; U.S. Pat. No. 3,057,585 granted Oct. 9, 1962 to John C. Ziegler, Lucien R. Beauregard and Harry Langer; and U.S. Pat. No. 3,119,580 granted Jan. 28, 1964 to Norman B. Murphy and all of which patents have been assigned to The Bendix Corporation.

In such prior controls, it was found that relative movement of the rotor and stator of the synchro or movement of the core relative to the windings of the transformer was accompanied by internal friction and hysteresis which introduced erroneous measurement. Further, redundance in such systems is not practical if minimum weight and size is desired.

In an effort to overcome the difficulties encountered in such prior control devices there have been heretofore utilized solid state strain gages attached to a control element of a control stick to detect pilot applied forces on the control element about two orthogonal axes as disclosed and claimed in a U.S. Pat. No. 3,447,766, granted June 3, 1969 to Raymond D. Palfreyman and assigned to The Bendix Corporation.

In such prior control stick arrangement, there has been provided a control element having a pair of spring sections orthogonal to one another to detect forces applied to the control element about two mutually perpendicular axes. At least one strain gage is preferably mounted on each side of a spring section to simultaneously detect the compression and tension of the spring section. The strain gages associated with each spring section are connected in a Wheatstone bridge to differentially unbalance the bridge when the spring section flexes so as to provide an output corresponding to the force applied to the spring section of the control element. Such arrangement in the control stick relates to distinctly different problems from those to which the present invention are directed.

Furthermore, in a U.S. Pat. No. 3,473,760 granted Oct. 21, 1969 to John C. Vaiden and assigned to The Bendix Corporation, in order to facilitate the sensing of the forces applied by the pilot to the control wheel in a roll axis sense, there are provided two rings operably connected by four rectangular leaf springs so that the rotation of one ring relative to the other deflects the springs in bending with one of the four springs being instrumented with semiconductor strain gages applied at each side and interconnected into an electrical bridge such that axial strains cancel out, but bending strains augment so as to render such strain gages of the hub force sensor responsive only to roll controlling forces applied to the control wheel.

Further, in such a complex structural arrangement, in order to facilitate the sensing of forces applied by the pilot to the control wheel in a pitch axis sense, two flanged sections of said other ring are formed with two reduced thickness sections, one in each of the flanged sections projecting from opposite sides of said other ring in an arrangement in which the two reduced thickness sections function as two rectangular leaf springs.

In instrumenting a control wheel hub so as to generate electrical signals corresponding to forces applied about two different axes two problems immediately appear: (1) how to accommodate the requirement that the pilot be able to apply forces to the control wheel with either or both hands without introducing signal errors related to point of force application on the control wheel and (2) how to avoid generating pitch responses to roll forces and vice-versa. Control wheel hub force sensor designs of a type such as disclosed in the aforenoted U.S. Pat. No. 3,119,580 granted Jan. 28, 1964 to Norman B. Murphy, utilize cylindrical race ball bearings to cancel the undesired twisting couples, which are at the heart of the problem.

SUMMARY OF THE INVENTION

In the simplified arrangement of the present invention, through the arrangement of a nutational bearing mounted in an inner hub portion of the control wheel and orthogonal to the axis of the control wheel, there may be coupled between the inner hub portion and the control wheel by the nutational bearing a simple control element having spring members orthogonal to one another and of a type such as described in the aforenoted U.S. Pat. No. 3,447,766. The members of such simple control element thus coupled to the control wheel include strain gages to sense linear and angular movement in pitch and roll senses of the control wheel utilizing cylindrical race ball bearings on the inner hub portion of a type, such as described in the aforenoted U.S. Pat. No. 3,119,580. The coupling of the simple control element between the control wheel and the inner hub portion thereof, thus avoids the much more complex structural arrangement of the rectangular leaf springs and flanged sections described and claimed in the aforenoted U.S. Pat. No. 3,473,760.

Thus in the present invention, one end portion of the control element may be affixed in the base element mounted on the control wheel, while the free end portion of the control element is coupled to the inner hub portion of the control wheel through the novel nutational ball bearing arrangement permitting linear and a nutating movement of the free end portion of the control element so that strain gages on the orthogonal spring members of the control element may provide signals corresponding to the flexure of the spring members in response to operation of the control wheel in said pitch and roll senses to modify an automatic pilot control system by the provision of separate electrical signals corresponding to the respective sensed roll and pitch controlling force inputs.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the drawings in which corresponding numerals indicate corresponding parts.

DESCRIPTION OF A PREFERRED EMBODIMENT

Figure 1:
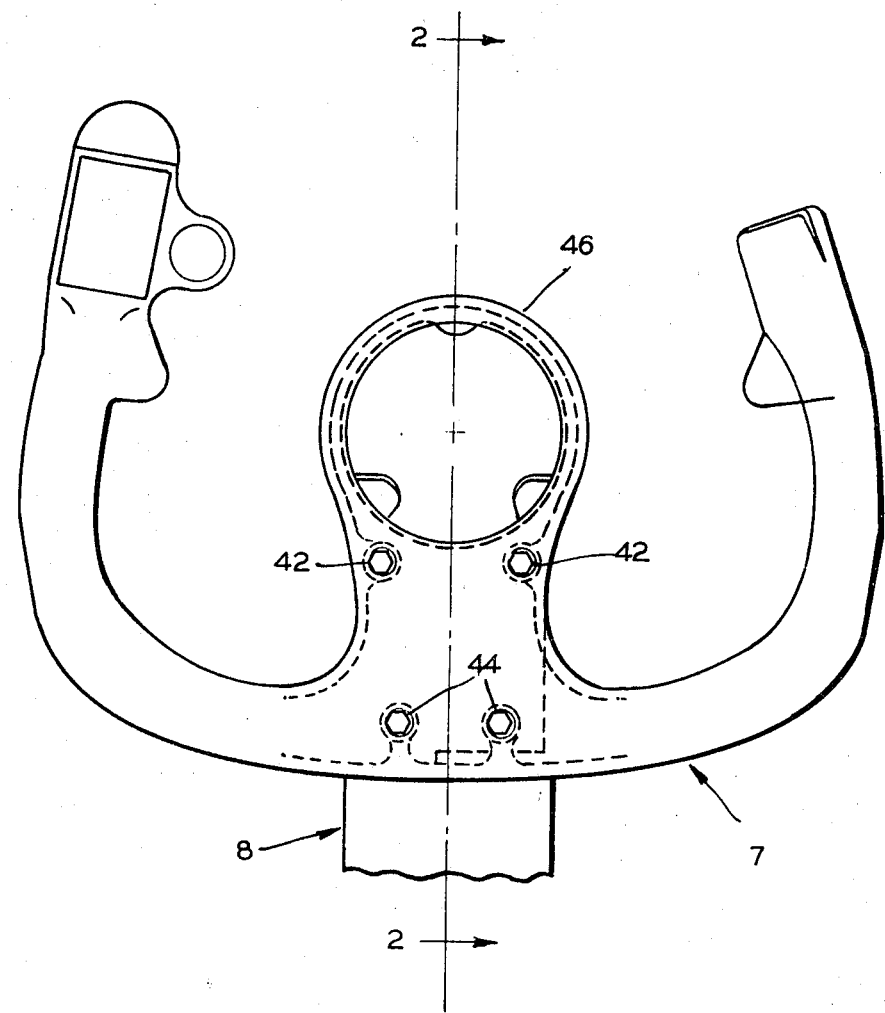
FIG. 1 is a front view of a control wheel and column assembly embodying the present invention.

In the aforenoted U.S. Pat. No. 3,473,760, there is disclosed an aircraft control system in which the improved control wheel of the present invention may be used. In the aforenoted system, the control surfaces of an aircraft may be operated automatically by an automatic pilot system or manually controlled by the improved control wheel 7 forming the subject matter of the invention and resiliently mounted on a control column 8, as shown herein by FIGS. 1, 2 and 3.

The manual control wheel 7 is mounted for angular movement about an axis X—X relative to the control column 8 so that angular displacements thereof about the axis X—X effectively control ailerons through operation of a suitable controller and servo motor, as indicated diagrammatically in the aforenoted U.S. Pat. No. 3,473,760, while fore and aft displacements of the control wheel 7 imparts pivotal movement to the control column 8 about another axis orthogonal to the axis X—X so as to in turn effectively control elevators through operation of a suitable controller and servo motor, as explained in the last mentioned patent.

Similarly as disclosed in the aforenoted U.S. Reissue Pat. No. 25,356, pitch and roll sensing devices operating in the automatic pilot apply electrical signals through conduits to motors so as to effect operation of the elevators and ailerons to provide the desired controlling action.

Upon an application to the manual control wheel 7 of a force in excess of a predetermined value, the deflective movement of the control wheel 7 is effective to cooperate with the steering shaft or control column, as explained hereinafter, to impart a force to override the operation of the controllers and servo motors by the automatic pilot and render the manual control wheel 7 effective to control the operation of the ailerons and elevators through the controllers and servo motors which may be of the type shown in the aforenoted U.S. Reissue Pat. No. 25,356, and explained therein.

IMPROVED CONTROL WHEEL HUB FORCE SENSOR DEVICE

In accordance with the present invention, there is provided an improved force translation means including electrical semiconductor strain gages 18 and 19 mounted exteriorly of the control column 8 and adjacent rectangular leaf spring elements or cantilevered spring sections 21 and 22 which extend in an orthogonal relation one to the other from an intermediate rigid block 23 of a hub force sensor device 20 of the control wheel 7.

Figure 2:
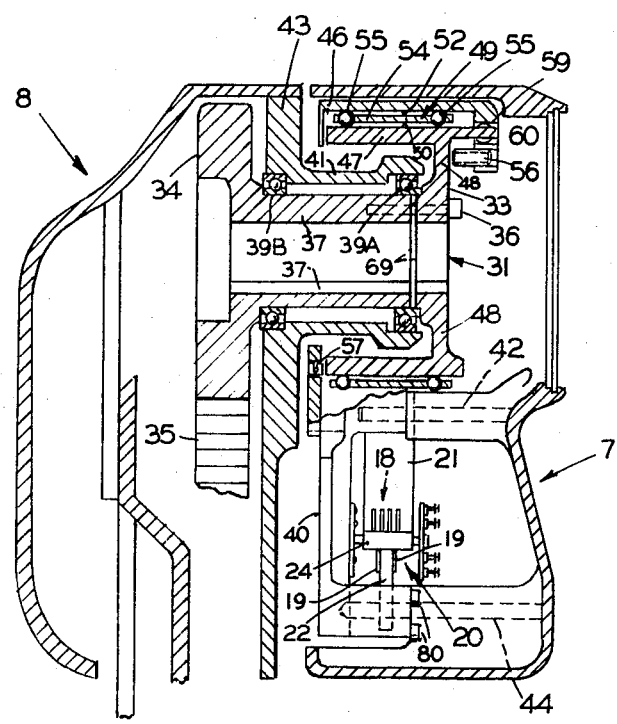
FIG. 2 is a fragmentary sectional view of FIG. 1 taken along the lines 2—2 of FIG. 1 and looking in the direction of the arrows.
Figure 3:
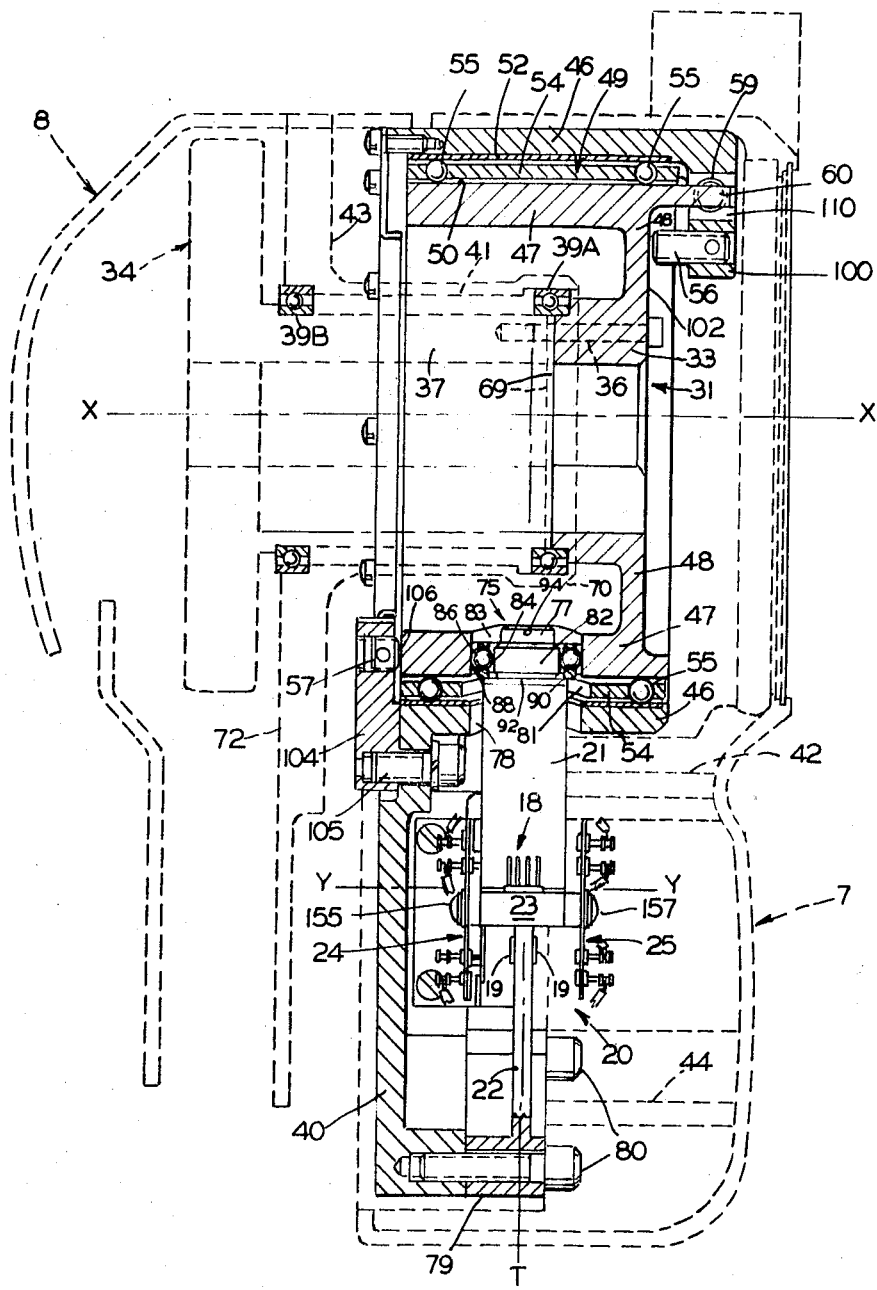
FIG. 3 is an enlarged sectional view of the force sensor device of FIG. 1, with the control wheel shown in dotted lines in assembled relation on the force sensor device.
Figure 4:
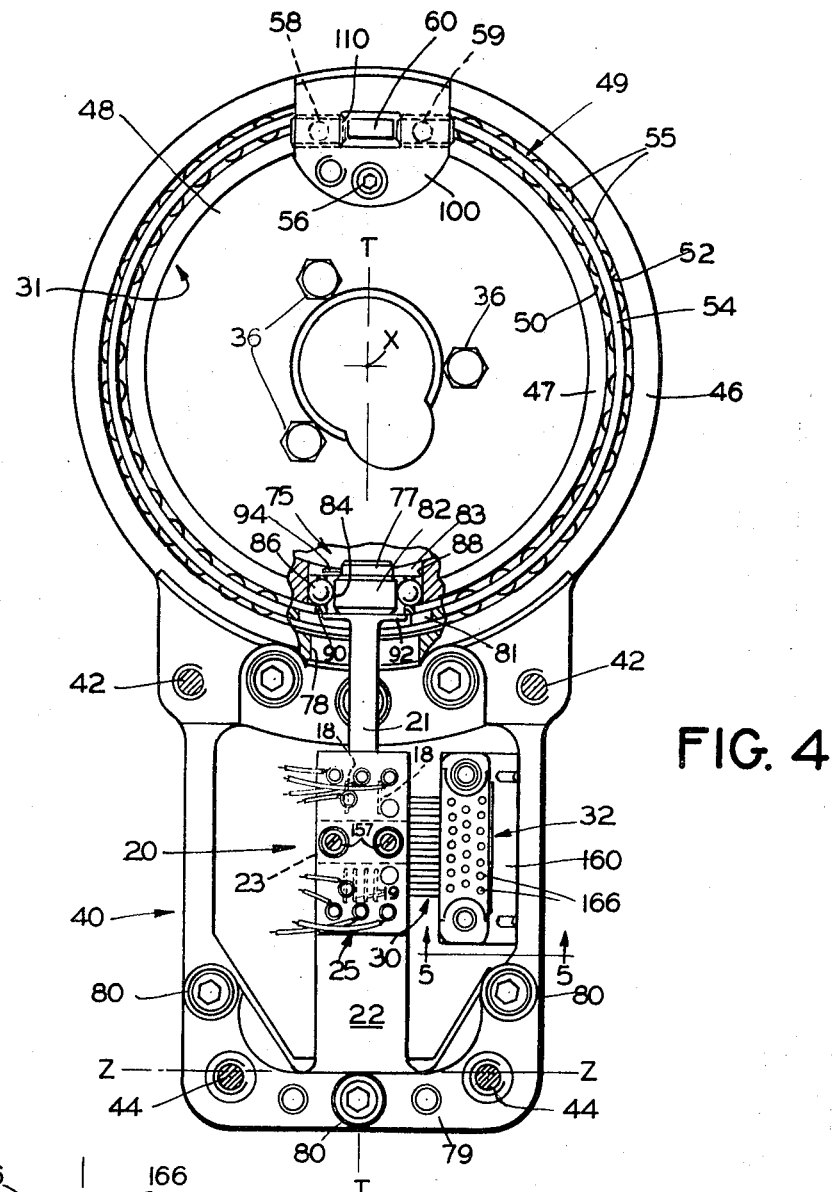
FIG. 4 is an enlarged front view of the force sensor device with certain parts broken away.

As shown by FIGS. 2 and 3, semiconductor strain gages 18 are attached to one side of a roll axis control force sensing leaf spring 21 while similar strain gages 18 are attached to the opposite side of the roll axis force sensing rectangular leaf spring 21. Similarly, as shown by FIG. 4, semiconductor strain gages 19 are attached to one side of pitch axis control force sensing rectangular leaf spring 22 while similar strain gages 19 are attached to the opposite side of the rectangular leaf spring 22. The strain gages 18 and 19 are secured to the leaf springs 21 and 22, respectively, by suitable bonding means, such as a suitable epoxy adhesive. The strain gages 18 and 19 may be of any suitable semiconductor types such as the piezo-resistive type strain gages which effects a change of electrical resistance when a tensile or compressive stress is applied thereto. The strain gages on one side of the leaf spring are under compression and the strain gages on the opposite side of the leaf spring are under tension when the spring section flexes and the change in resistance of the strain gages is a measure of the flexure of the spring section.

While, the embodiment shown and described, uses similar strain gages of either positive or negative gage factor on opposite sides of a spring section so that one strain gage is in compression and the other strain gage is in tension, it should be understood that strain gages having positive and negative gage factors may also be used. With this arrangement the positive and negative factor strain gages will be mounted on the same side of a spring section so that both strain gages are under tension or compression, depending upon the direction of flex of the spring section. The resistance of one strain gage will increase and the resistance of the other strain gage will decrease to provide a differential output from a conventional bridge circuit in which the strain gages are connected.

As explained in the U.S. Pat. No. 3,447,766, a Wheatstone bridge having an input source of an alternating voltage or direct voltage may be provided including piezo-resistive strain gages 18 mounted on opposite sides of the single rectangular leaf spring 21 and electrically connected in the bridge circuit in a balanced configuration with two resistors. A similar bridge circuit is provided for strain gages 19 mounted on the rectangular leaf spring 22. In the balanced configuration, the rectangular leaf springs 21 and 22 are not flexed whereupon the output voltage from the controlled bridge circuits will be zero. However, upon the leaf springs 21 and 22 being flexed in response to an applied control force in a roll or pitch sense, respectively, there will be applied at the outputs of the controlled bridge circuits an alternating current signal of a phase or a direct current signal of a polarity dependent upon the sense of the control force selectively applied to the leaf spring elements 21 or 22 in the roll or pitch senses, respectively, and of a magnitude proportional to the applied control force. The several resistor elements of the respective bridge circuits may be mounted on panel assemblies, as shown by FIGS. 3 and 4 and indicated generally by the numerals 24 and 25, to which there lead conductors from the controlling piezo-resistor strain gages 18 and 19 and from which there may lead appropriate output conductors, as well as electrical energizing conductors indicated generally by the numeral 30 to the terminal block assembly 32 of FIG. 4.

The outputs from the bridge circuits thus controlled by the semiconductor strain gages 18 and 19 are electrically included in the control system so that upon a force being applied to the manual control wheel 7 less than that required to overcome the operation of the elevator or aileron servo motors, there is developed a signal proportional to this force and in a sense, depending upon the direction of the application of force.

The signal is then applied through the appropriate output conductors 30 and a pitch setting channel conduit or a roll setting channel conduit, as the case may be, and to either or both of a pair of low pass filters and through conduits leading from these filters to the automatic pilot control system to vary the setting of the automatic pilot system, as described in the aforenoted U.S. Reissue Pat. No. 25,356 and in the U.S. Pat. No. 3,119,580. As explained therein, the low pass filters are provided so that the inertia of the pilots hand and the spring rate of the control wheel 7 will not form an oscillating system in varying the setting of the automatic pilot system.

The control wheel 7 forming the subject matter of the present invention is shown in detail in FIGS. 2 and 3 and includes an improved hub force sensor 20 so that the pilot may, by applying normal control forces to the wheel 7, maneuver the aircraft while it is on automatic control.

The control wheel 7 is yieldably coupled through the novel hub force sensor device 20 to a hub member indicated generally by the numeral 31. The hub member 31 includes a hollow hub portion 33 drivingly connected by bolts 36 to a sprocket 34 through a hollow shaft portion 37 of the sprocket 34. The hollow hub portion 33 and the hollow shaft portion 37 drivingly connected thereto by the bolts 36 are rotatably mounted by ball bearings 39A and 39B in a hollow hub portion 41 projecting from an end plate 43 of the column 8. A sprocket chain 35 passes over the sprocket 34 in operative relation. The chain 35 is in turn drivingly connected so as to actuate in a conventional manner a mechanical linkage to operate roll control ailerons, while the column 8 is pivotally mounted in a conventional manner so as to actuate a mechanical linkage to operate pitch control elevators of the aircraft, as explained in the aforenoted U.S. Pat. No. 3,473,760.

Thus upon appropriate forces being exerted on the steering wheel 7 in an angular sense, the applied force may be transmitted through the hub member 31, sprocket 34, chain 35 to actuate the linkage to effectively operate, the controller for the ailerons, while upon appropriate forces being exerted on the steering wheel 7 in a fore or aft sense the applied force may be transmitted by pivotal movement of the column 8 to actuate the linkage to effectively operate the controller for the elevators of the aircraft.

The arrangement is such that the control wheel 7, as shown by FIGS. 2 and 3, is yieldably coupled to the hub member 31 through the novel hub force sensor 20 which includes a base member 40 rigidly connected to the control wheel 7 by bolts 42 and 44, as shown by FIGS. 1, 2 and 3.

The base member 40, thus rigidly connected to the control wheel 7, has projecting axially therefrom in relation to the control wheel 7 an outer hub portion 46, as shown by FIGS. 1, 2, 3 and 4. Furthermore, within the hub portion 46, there is provided a cylindrical race bearing 49, shown by FIGS. 2, 3 and 4 including an inner race 50 defined by the outer surface of a second hub portion 47 connected by a web 48 to the hollow hub portion 33 of the hub member 31. The hub portion 47 is concentrically positioned within the hub portion 46 and arranged in spaced relation thereto. The cylindrical race bearing 49, includes an outer race 52 defined by the inner surface of the hub portion 46, and a ball bearing cage or separator 54 carrying ball bearings 55 between the inner race 50 and the outer race 52. The cylindrical race bearing 49 is so arranged as to permit both axial and angular movements of the control wheel 7 relative to the hub member 31, as limited by suitable adjustable stop means carried by the hub portion 46.

As hereinafter explained in greater detail, such adjustable stop means include the stop bolts 56 and 57 carried by the hub portion 46 and operatively positioned selectively by a fore or aft positioning of the pilot's control wheel 7 to engage the hub member 31 so as to effect axial movement thereof along axis X—X and a pitch down or pitch up pivotal adjustment of the control column 8 of the aircraft, as best shown by FIGS. 2 and 3. The bolts 36 operatively connect the hub member 31 to the hollow shaft portion 37 and thereby through bearings 39A and 39B so arranged in the hub portion 41 as to effect the pivotal adjustment of the control column 8 in response to the axial movement of the hub member 31.

Further, there are provided the stop bolts 58 and 59, carried by the hub portion 46 and operatively positioned by angular movement of the pilots control wheel 7 in clockwise or counterclockwise directions, respectively, as view in FIG. 4, to selectively engage a finger portion 60 projecting from the hub portion 47 of the hub member 31 and thereby effect a corresponding roll adjustment through the hub portion 33 drivingly connected to the hollow shaft portion 37 of the aircraft control sprocket 34.

The arrangement is such that the ball bearings 39A support adjacent end portions 69 of the hollow hub portion 33 of the hub member 31 and the hollow shaft portion 37 of the sprocket 34 within a hub portion 41 projecting from an end plate 43 of the control column 8, while the ball bearings 39B support outer end portions of the hollow shaft portion 37 within the end plate 43 of the control column 8. The cylindrical race ball bearings 49, including inner race 50, outer race 52 and cage 54 carrying the ball bearings 55 rotatable about the axis of rotation X—X of the control wheel 7, serve to cancel the twisting couples so as to avoid generating pitch responses to roll forces applied to the control wheel 7 about the axis X—X or roll responses to pitch forces applied axially along the axis X—X of the control wheel 7, as explained in the aforenoted U.S. Pat. No. 3,119,580.

NUTATIONAL COUPLING BEARING

Further, in the present invention, the hub portion 47 of the hub member 31 which is drivingly connected by the bolts 36 to the shaft portion 37 of the sprocket 34 is yieldably coupled through a novel nutational coupling bearing 75, as best shown in FIG. 3, to a free end shaft portion 77 of a force sensor indicated generally by the numeral 20.

The force sensor 20 may be of a type described and claimed in the aforenoted U.S. Pat. No. 3,447,766, including the first cantilevered spring section 21 flexible about the roll control axis Y—Y of FIG. 3, but rigid about the pitch control axis Z—Z of FIG. 4, while the second cantilevered spring section 22 is flexible about the pitch control axis Z—Z of FIG. 4, but rigid about the roll control axis Y—Y of FIG. 3.

The spring sections 21 and 22 extend from the intermediate rigid block 23 orthogonal one to the other with a lower end of the spring section 22 being formed integral with a mounting flange 79 which is in turn secured to the base member 40 by suitable screw threaded fastening bolts 80. Projecting from the upper end of the spring section 21 is the free end shaft portion 77 extending along an axis T—T orthogonal to the axis X—X of the control wheel 7. The free end shaft portion 77 further extends in spaced relation through an aperture 83 formed in an annular wall of the hub portion 47, while an aperture 81 in the cage 54, and an aperture 78 in an annular wall of hub portion 46, receive in spaced relation therein an end portion of the spring section 21.

A bearing sleeve 82 is mounted on the shaft portion 77, while an outer surface of the bearing sleeve 82 provides an inner race 84 for ball bearings 86 of the nutational coupling bearing 75. There is further provided an outer race 88 corresponding to the surface defining the aperture 83 formed in the annular wall of the hub portion 47, and a ball bearing cage or separator 90 carrying the ball bearings 86 in cooperative relation between the inner race 84 and the outer race 88.

A flange 92 projects from a lower end of the shaft portion 77 and bears on a lower end of the cage 90, while a pin 94 projects from an upper end of the shaft portion 77 in a normal spaced relation to an upper end of the cage 90 so as to captivate the cage 90 on the shaft portion 77 during a flexing of the force sensor 20. The arrangement is such that the nutational coupling bearing 75 permits linear movement of the free end shaft portion 77 and bearing sleeve 82 in relation to the ball bearings 86, as well as a nutating movement of the free end shaft portion 77 or bearing sleeve 82 in the bearing 75 upon either an angular or a linear movement of the base member 40 by the pilots control wheel 7. Such movement of the base member 40 by the operation of the pilots control wheel 7 imparts a corresponding movement to the hub portion 46 relative to the inner hub portion 47 within the limits permitted by the roll adjustment stop bolts 58 and 59 of FIG. 4, as well as the limits permitted by the pitch adjustment stop bolts 56 and 57 of FIG. 3, respectively.

The positioning of the outer hub portion 46 relative to the inner hub portion 47 is effected in opposition to the biasing force of the roll axis control force sensing leaf spring 21 flexible about the roll axis Y—Y of FIG. 3; and in opposition to the biasing force of the pitch axis control force sensing leaf spring 22 flexible about the pitch axis Z—Z of FIG. 4 so as to vary the resistance of the semiconductor strain gages 18 and 19 in response to the stress and sense of the stress applied to the leaf springs 21 and 22 about the roll and pitch axes Y—Y and Z—Z respectively, as heretofore explained.

Moreover upon the outer hub portion 46 being returned by operation of the control wheel 7 to a neutral position, the free end shaft portion 77 of the force sensor 20 will be returned under the biasing force of the effective spring sections 21 or 22 to a corresponding neutral null force sensing condition within the limited adjustment range permitted by the aforenoted stop bolts 58 and 59 and 56 and 57.

As best shown by FIGS. 3 and 4, the adjustable stop bolt 56 is screw threadedly engaged in a flange 100 which projects downwardly at right angles from the outer hub portion 46 and in spaced relation to an outer surface 102 of the web 48 of the inner hub portion 47.

Thus upon operation of the control wheel 7 in a pitch down sense so as to effect linear movement of the hub portion 46 along the axis X—X of the hub member 31 to the left, as viewed in FIG. 3, the stop bolt 56 will at the limit of the permitted range of adjustment contact the outer surface 102 of the web 48 of the inner hub portion 47 so as to angularly position the control column 8 in a counterclockwise pitch down sense.

Figure 6:
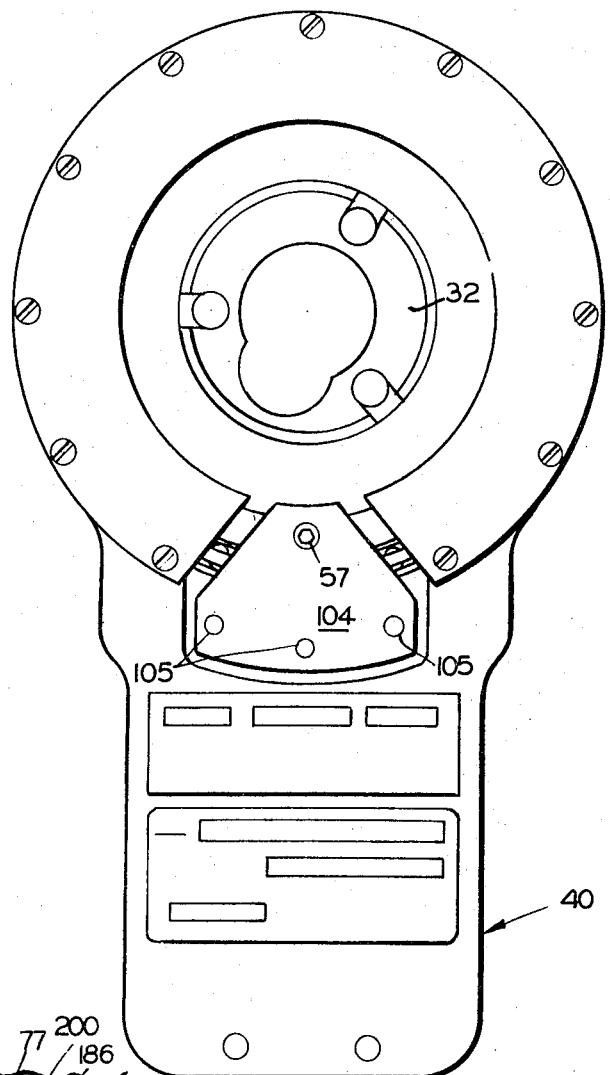
FIG. 6 is an enlarged back view of the device.

Similarly, as best shown by FIGS. 3 and 6, an adjustable stop bolt 57 is screw threadedly engaged in a second flange plate 104 secured by bolts 105 to the base member 40. The second flange 104 projects upwardly from the base member 40 and in spaced relation to an outer end surface 106 of the inner hub portion 47.

Thus upon operation of the control wheel 7 in a pitch up sense so as to effect linear movement of the hub portion 46 along the axis X—X of the hub member 31 to the right, as viewed in FIG. 3, the stop bolt 57 will at the limit of the permitted linear range of adjustment contact the outer end surface 106 of the inner hub portion 47 so as to angularly position the control column 8 in a clockwise pitch up sense.

Furthermore, as best shown by FIGS. 3 and 4, the finger portion 60 projects from the inner hub portion 47 into an aperture 110 formed in the flange 100 and in spaced relation to ends of stop bolts 58 and 59 screw threadedly adjustable in the flange 100 and projecting into the aperture 110 at opposite sides of the finger portion 60 so as to permit limited angular adjustment of the outer hub portion 46 relative to the inner hub portion 47 and about the axis X—X of the control wheel 7 in the roll control senses, as heretofore described.

Thus upon operation of the control wheel 7 in a clockwise or roll right sense, as viewed in FIG. 4, the stop bolt 58 will at the limit of the permitted range of adjustment contact an adjacent side surface of the finger 60 so as to angularly position the inner hub portion 47 of the hub member 31 to drive the sprocket 34 and chain 35 so as to effect operation of the roll control ailerons of the aircraft through suitable control mechanism, as heretofore described, in the roll right control sense, while upon operation of the control wheel 7 in an opposite counter clockwise or roll left sense, the stop bolt 59 will at the limit of the permitted range of adjustment in the latter sense contact an opposite adjacent side surface of the finger 60 so as to angularly position the inner hub portion 47 to drive the shaft 37 and sprocket 34 in an opposite sense to effect operation of the roll control ailerons of the aircraft in the roll left control sense.

Further, as shown by FIGS. 3 and 4, the panel assemblies 24 and 25 formed of a suitable electrical insulating material are secured by mounting bolts 155 and 157, respectively, intermediate the opposite ends thereof to opposite end surfaces of the rigid block 23. On the panel assemblies 24 and 25, there may be mounted suitable resistor elements, not shown, providing the respective Wheatstone bridge control circuits which yield the final desired result — electrical signals corresponding to the force inputs applied in the roll and pitch senses.

Moreover suitable electrical conductors 30 are provided between the respective panel assemblies 24 and 25 and the terminal block assembly 32, as shown by FIG. 4.

Figure 5:
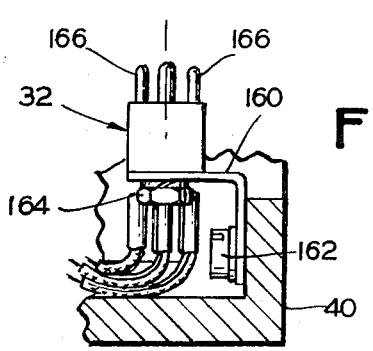
FIG. 5 is a fragmentary sectional view of the terminal block assembly of FIG. 4 taken along the lines 5—5 and looking in the direction of the arrows.

Moreover, as shown in somewhat greater detail by FIG. 5, the terminal block assembly 32 is mounted on the base member 40 by a right angle bracket 160 secured to the base member 40 by suitable mounting bolts 162 and to the terminal block assembly 32 by fastening bolts 164. Suitable terminal prongs 166 are provided in the terminal block assembly 32 for mating with corresponding terminals of a connector plug for connection in turn into the electrical control system of the aircraft, as heretofore explained.

OPERATION

From the foregoing, it will be seen that forces applied by the pilot to the control wheel 7 may, as illustrated by FIGS. 3 and 4, produce stress in either or both of spring sections 21 and 22 depending on the direction of the applied force with respect to axes Y—Y and Z—Z corresponding to the roll and pitch axes of the aircraft. Strain gages 19 on one side of a spring section 22 will, for example, be under tension and strain gages 19 on the opposite side of spring section 22 will be under compression for a given flex about axis Z—Z, as shown in FIGS. 3 and 4. The piezo-resistive properties of the strain gages effect a change in electrical resistivity with the applied stress thereby producing a high proportional signal output.

In particular, a force applied about axis Z—Z, for example, flexes spring section 22 and causes the attached strain gages 19 to change resistance to differentially unbalance the bridge and provide an output voltage corresponding to the axial force applied to the control wheel 7 along axis X—X. Similarly, a Wheatstone bridge may be provided to measure flexure of spring section 21 caused by any force component exerted about the axis Y—Y.

If redundancy is desired, then a plurality of strain gages may be mounted on each side of the spring sections 21 and 22 such as shown by the strain gages 18 on one side of spring section 21 and strain gages 19 on one side of spring section 22 and the strain gages may be connected in bridge circuits in the manner illustrated in U.S. Pat. No. 3,447,766.

Furthermore through the novel nutational coupling bearing 75 mounted in the inner hub portion 47 of the control wheel 7, a hub force sensor device 20 of the aforenoted type mounted in the base member 40 affixed to the control wheel 7 and extending in orthogonal relation to the axis X—X of the control wheel 7 may be so operatively coupled by the nutational bearing 75 to the inner hub portion 47 that a stress may be applied to the hub force sensor 20 within the limited range of angular and linear movements of the outer hub portion 46 relative to the inner hub portion 47 of the control wheel 7 permitted by the stop means 56–57 and 58–59 carried by the outer hub portion 46. Moreover through the provision of the cylindrical race ball bearing arrangement 50–55 between the outer and inner hub portions 46 and 47 of the control wheel 7 undesired twisting couples may be avoided, while roll and pitch forces applied to the control wheel 7 by angular and fore and aft pressures applied thereto may be effectively measured.

Thus the roll sensor resistive elements 18 carried by the first cantilevered spring section 21 flexible about the roll control axis Y—Y of FIG. 3 are effectively coupled by the nutational bearing 75 between the inner hub portion 47 and the control wheel 7 so as to measure the applied roll control force upon the operator of the control wheel 7 rotating the wheel 7 or applying a pressure in an angular sense within the range limited by the stop bolts 58–59.

Further upon the operator applying a fore or aft pressure to the control wheel 7, the pitch sensor resistive elements 19 carried by the second cantilevered spring section 22 flexible about the pitch control axis Z—Z of FIG. 4 are effectively coupled by the nutational bearing 75 between the inner hub portion 47 and the control wheel 7 so to effectively measure the applied pitch control force within the range limited by the stop bolts 56–57.

MODIFIED FORM OF THE INVENTION OF FIGURE 7

Figure 7:
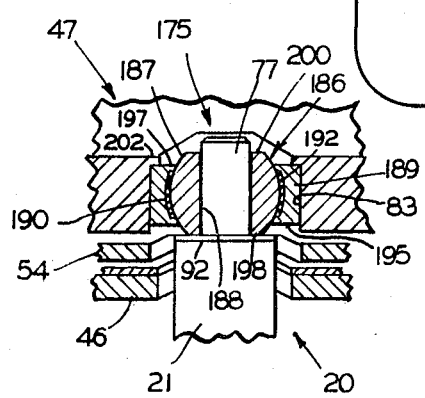
FIG. 7 is a fragmentary sectional view of a modified form of the invention.

A modified form of the invention has been illustrated by the fragmentary sectional view of FIG. 7, particularly in the provision of a mono-ball nutational coupling bearing 175 instead of the multi-ball nutational coupling bearing 75 of FIGS. 3 and 4.

The assembly of the mono-ball nutational coupling bearing 175 in the control wheel force sensor device of the modified form of the invention of FIG. 7, rests in an inventive concept which simplifies the assembly of the control wheel force sensor device in the provision of a single semi-spherical inner bearing member, while at the same time the assembly of the modified form of the invention of FIG. 7 is such as to provide by the nutational coupling bearing 175 a greater load carrying capacity of such bearing in the limited space requirements, as thus provided, than that of the cylindrical race multiple ball nutational bearing of the type shown in FIG. 3 and indicated therein by the numeral 75, so as to raise the percent of durability and certainty of operation of the control wheel force sensor device of a type embodying the modified form of the invention of FIG. 7, and effect a condition of greater durability and one which is more sure to produce the desired results in emergency and not only with greater certainty, but with less expense.

The mono-ball bearing assembly 175 of FIG. 7 may be of a construction of a type such as described in U.S. Pat. No. 3,085,312, granted Apr. 16, 1963 to Jack B. Evans; U.S. Pat. No. 2,724,172, granted Nov. 22, 1955 to Lee R. Potter and U.S. Pat. No. 2,626,841 granted Jan. 27, 1953 to Lee R. Potter.

Thus the mono-ball nutational coupling bearing 175 includes inner and outer bearing members, the inner bearing member comprising a single semi-spherical bearing member 186 having a semi-spherical bearing surface 187 and a concentric axially disposed bore 188 for receiving in slidable relation therein the free end shaft portion 77 of the force sensor 20 of a control wheel force sensor such as heretofore described with reference to FIG. 3.

The outer bearing member comprises an outer bearing race member 189 having a semi-spherical socket 190 corresponding in shape to the semi-spherical bearing surface 187 of the inner bearing member 186 and so arranged as to provide an outer race surface for the inner bearing member 186. Further there may be inserted in the semi-spherical surface of the socket 190 a strip or layer 192 of a suitable plastic material having self-lubricating characteristics and so arranged as to effectively lubricate the semi-spherical surfaces 187 of the inner bearing member 186 and the socket 190 of the race member 189. The layer 192 may be formed of a polytetrafluoroethylene resin known under the trade name of "Dyflon" or "Teflon" and having the specified self-lubricating characteristics.

Further the outer race member may have parallel lower and upper radial end walls 195 and 197 respectively, while the inner bearing member 186 may have parallel lower and upper radial end walls 198 and 200 which in the normal null force sensing condition of the force sensor 20 are positioned in a slightly raised relation to the corresponding lower and upper end walls 195 and 197 of the outer race member 189, as shown by FIG. 7.

The arrangement is such then that the lower end wall 198 of the inner bearing member 186 is positioned in contiguous relation to the flange 92 projecting from the lower end of the shaft portion 77, while the outer bearing member 189 is positioned by a shoulder 202 projecting from the upper inner surface of the aperture 83.

Moreover, the inner member 186 may be angularly positioned in the outer member 189 so that a predetermined limited range of permissible linear movement of the free end shaft portion 77 in the axial bore 188 of the semi-spherical bearing member 186 may be effective in relation to the bearing member 186 during a flexing of the force sensor 20 from a neutral null force sensing condition, as heretofore described.

Furthermore, the outer race bearing member 189 is positioned in a tight force fit in the aperture 83 formed in the annular wall of the hub portion 47 of the hub member 31 with the upper wall 197 of the race member 189 being positioned contiguous to the shoulder or lip portion 202 at the upper edge of the surface defining the aperture 83 in the hub portion 47.

The arrangement is such then that the nutational mono-ball bearing assembly 175 permits linear movement of the free end shaft portion 77 in the axially disposed bore 188 of the bearing member 186 as well as a nutating movement of the free end shaft portion 77 in following angular movement of the semi-spherical inner bearing member 186 in the socket 190 of the outer race bearing member 189 in response to either an angular or a linear movement of the base member 40 by the pilots control wheel 7. Such movement of the base member 40 by the operation of the pilot's control wheel 7 imparts a corresponding movement to the hub portion 46 relative to the inner hub portion 47 within the limits permitted by the roll adjustment stop bolts 58 and 59 of FIG. 4, as well as the limits permitted by the pitch adjustment stop bolts 56 and 57 of FIG. 3, respectively.

The positioning of the outer hub portion 46 relative to the inner hub portion 47 is effected in opposition to the biasing force of the roll axis control force sensing leaf spring 21 flexible about the roll axis Y—Y of FIG. 3; and in opposition to the biasing force of the pitch axis control force sensing leaf spring 22 flexible about the pitch axis Z—Z of FIG. 4 so as to vary the resistance of the semiconductor strain gages 18 and 19 in response to the stress and sense of the stress applied to the leaf springs 21 and 22 about the roll and pitch axes Y—Y and Z— Z respectively, as heretofore explained, with reference to the control wheel force sensor device of FIGS. 3 and 4.

Although only two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

WHAT IS CLAIMED IS:

1. For use in an aircraft steering system of a type including a control column mounted to move about a first axis, a steering means rotatably mounted in said column and movable about a second axis orthogonal to the first axis, an operator-operative control member having an outer hub portion connected thereto and coaxially arranged in relation to said steering means, a cylindrical race bearing means mounted betrween said inner and outer hub portions, stop means carried by one of said hub portions and arranged in cooperative relation to the other of said hub portions so as to permit movement of said outer hub portions relative to said inner hub portion in angular and linear senses on said cylindrical race bearing means and within limited ranges defined by said stop means, and said stop means drivingly connecting said outer hub portion to said innr hub portion upon said outer hub portion being positioned by said operator-operative control member relative to said inner hub portion in excess of any of said limited ranges in any one of said senses; an improvement comprising a base member connected to said operator-operative control member, a flexible control element having one end portion secured to said base member and an opposite other end portion extending in an orthogonal relation to the second axis of said steering means, a nutational bearing means mounted in a side wall portion of the inner hub portion drivingly connected to said steering means, said outer hub portion and said cylindrical race bearing means having corresponding openings therein, the other end portion of the control element extending through said openings in the outer hub portion and said cylindrical race bearing means in said orthogonal relation to the second axis of said steering means and into said nutational bearing means, said nutational bearing means being arranged to receive the other end portion of the control element so as to permit a linear and a nutational movement of the other end portion of the control element in said nutational bearing means upon a movement being imparted to said outer hub portion relative to said inner hub portion, said relative movement being imparted to said outer hub portion in response to movement of said control member in said angular and linear senses and within said limited ranges so as to effect a flexure of the other end portion of the control element, and stress sensor means carried by the flexible control element and responsive to the sense of the flexure of the other end portion of the control element to provide electrical signals corresponding to the magnitude and sense of the movement of the control member in said angular and linear senses within said limited ranges.

2. The improvement defined by claim 1 in which the nutational bearing means includes a plurality of ball bearings, an outer race surface provided in said side wall portion, and the other end portion of the control element providing an inner race surface for said ball bearings, and the other end portion of the control element being movable linearly in relation to the ball bearings of the nutational bearing means so as to permit the nutation of the other end portion of the control element within the nutational bearing means and in relation to the ball bearings of said nutational bearing means in response to the magnitude and sense of the movement of the control member in said angular and linear senses within said limited ranges.

3. The improvement defined by claim 1 in which the nutational bearing means includes an inner bearing member having a semi-spherical bearing surface and an axial bore extending through the inner bearing member, the other end portion of the control element being positioned in slidable relation in the axial bore of the inner bearing member, an outer race provided in the side wall portion of the inner hub portion and having a semi-spherical socket corresponding in shape to the semi-spherical bearing surface of the inner bearing member, the inner bearing member being positioned in the socket of the outer race, and the other end portion of the control element being movable linearly in the axial bore of the inner bearing member so as to permit said other end portion of the control element to follow angular movement of the inner bearing member in the socket of the outer race with said nutational movement in said nutational bearing means in response to the magnitude and sense of the movement of the control member in said angular and linear senses within said limited ranges.

4. The improvement defined by claim 1 in which the control element includes a first spring section adapted to flex upon a force being exerted on the control element about one axis extending parallel to the first axis and being rigid about another axis extending parallel to the second axis, a second spring section, the second spring section adapted to flex upon a force being exerted on the control element about another axis extending parallel to the second axis and being rigid about an axis extending parallel to the first axis, and the stress sensor means includes stress sensor elements mounted on the spring sections and responsive to flexure of the associated spring section so as to provide the electrical signals corresponding to the forces exerted on the control element about said one axis and said other axis in response to the flexure of the other end portion of the control element by the force exerted on the control member in said angular and linear senses within said limited ranges.

5. The improvement defined by claim 1 in which the nutational bearing means includes a plurality of ball bearings, an outer race surface provided in said side wall portion, and the other end portion of the control element providing an inner race surface for said ball bearings, and the other end portion of the control element being movable linearly in relation to the ball bearings of the nutational bearing means so as to permit the nutation of the other end portion of the control element within the nutational bearing means and in relation to the ball bearings of said nutational bearing means in response to the magnitude and sense of the movement of the control member in said angular and linear senses within said limited ranges; and in which said control element includes a first spring section adapted to flex upon a force being exerted on the control element about one axis extending parallel to the first axis and being rigid about another axis extending parallel to the second axis, a second spring section, a rigid portion intermediate the first spring section and the second spring section to operatively connect the first and second spring sections, the second spring section adapted to flex upon a force being exerted on the control element about another axis extending parallel to the second axis and being rigid about an axis extending parallel to the first axis, and the stress sensor means includes stress sensor elements mounted on the spring sections and responsive to flexure of the associated spring section so as to provide the electrical signals corresponding to the forces exerted on the control element about said one axis and said other axis in response to the flexure of the other end portion of the control element by the force exerted on the control member in said angular and linear senses within said limited ranges.

6. The improvement defined by claim 1 in which the nutational bearing means includes an inner bearing member having a semi-spherical bearing surface and an axial bore extending through the inner bearing member, the other end portion of the control element being positioned in slidable relation in the axial bore of the inner bearing member, an outer race provided in the side wall portion of the inner hub portion and having a semi-spherical socket corresponding in shape to the semi-spherical bearing surface of the inner bearing member, the inner bearing member being positioned in the socket of the outer race, and the other end portion of the control element being movable linearly in the axial bore of the inner bearing member so as to permit said other end portion of the control element to follow angular movement of the inner bearing member in the socket of the outer race with said nutational movement in said nutational bearing means in response to the magnitude and sense of the movement of the control member in said angular and linear senses within said limited ranges; and in which said control element includes a first spring section adapted to flex upon a force being exerted on the control element about one axis extending parallel to the first axis and being rigid about another axis extending parallel to the second axis, a second spring section, a rigid portion intermediate the first spring section and the second spring section to operatively connect the first and second spring sections, the second spring section adapted to flex upon a force being exerted on the control element about another axis extending parallel to the second axis and being rigid about an axis extending parallel to the first axis, and the stress sensor means includes stress sensor elements mounted on the spring sections and responsive to flexure of the associated spring section so as to provide the electrical signals corresponding to the forces exerted on the control element about said one axis and said other axis in response to the flexure of the other end portion of the control element by the force exerted on the control member in said angular and linear senses within said limited ranges.

7. The improvement defined by claim 1 in which said control element includes a first spring section adapted to flex upon a force being exerted on the control element about one axis extending parallel to the first axis and being rigid about another axis extending parallel to the second axis, a second spring section, a rigid portion intermediate the first spring section and the second spring section to operatively connect the first and second spring sections, the second spring section adapted to flex upon a force being exerted on the control element about another axis extending parallel to the second axis and being rigid about an axis extending parallel to the first axis, and the stress sensor means includes stress sensor elements mounted on the spring sections and responsive to flexure of the associated spring section so as to provide the electrical signals corresponding to the forces exerted on the control element about said one axis and said other axis in response to the flexure of the other end portion of the control element by the force exerted on the control member in said angular and linear senses within said limited ranges, a pair of electrical terminal panels mounted at opposite sides of the rigid portion of the control element, electrical conductors leading from the stress sensor elements to the terminal panels, an electrical connector block mounted on the base member, and other electrical conductors leading from the electrical terminal panels to the electrical connector block for connection into the aircraft steering system.

8. A force sensor comprising in combination, a base member, an operator-operative control member, the base member being affixed to the operator-operative control member, an inner hub portion coaxially arranged in relation to the control member, the control member being movably mounted in relation to the inner hub portion in angular and axial senses and within limited ranges, a flexible control element having one end portion secured to said base member and an opposite other end portion extending in an orthogonal relation to an axis of said inner hub portion, bearing means mounted in a side wall portion of said inner hub portion, the other end portion of the control element being mounted in said bearing means in such a manner as to permit linear movement and nutation of the other end portion of the control element in said bearing means upon flexure of said other end portion of the control element, the flexure of said other end portion of the control element, the flexure of said other end portion of the control element being effected upon a force being applied to said one end portion of the control element, the force being applied to said one end portion of the control element secured to said base member upon movement of the control member in angular and axial senses relative to said inner hub portion and within said limited ranges so as to effect a flexure of the other end portion of the control element, and stress sensor means carried by the flexible control element and responsive to the sense of the flexure of the other end portion of the control element to provide electrical signals corresponding to the magnitude and sense of the movement of the control member in said angular and linear senses within said limited ranges.

9. The force sensor defined by claim 8 in which the bearing means includes a plurality of ball bearings, an outer race surface provided in said side wall portion, and the other end portion of the control element providing an inner race surface for said ball bearings, and the other end portion of the control element being movable linearly in relation to the ball bearings of the bearing means so as to permit the nutation of the other end portion of the control element within the bearing means and in relation to the ball bearings of said bearing means in response to the magnitude and sense of the movement of the control member in said angular and linear senses within said limited ranges.

10. The force sensor defined by claim 8 in which the bearing means includes a mono-ball nutational bearing, an outer race surface for said mono-ball bearing provided in said side wall portion of the inner hub portion, said mono-ball bearing having an axial bore, the other end portion of the control element being slidably mounted in said axial bore and movable linearly in the mono-ball bearing of the bearing means so as to permit nutation of the other end portion of the control element within the bearing means upon angular movement of the mono-ball bearing on the outer race surface of said bearing means in response to the magnitude and sense of the movement of the control member in said angular and linear senses within said limited ranges.

11. The force sensor defined by claim 8 in which the bearing means includes an inner bearing member having a semi-spherical bearing surface and an axial bore extending through the inner bearing member, the other end portion of the control element being positioned in slidable relation in the axial bore of the inner bearing member, an outer race member mounted in the side wall portion of the inner hub portion and having a semi-spherical socket corresponding in shape to the semi-spherical bearing surface of the inner bearing member, the inner bearing member being positioned in slidable relation in the socket of the outer race member, and the other end portion of the control element being movable linearly in the axial bore of the inner bearing member so as to permit the nutation of the other end portion of the control element within the bearing means in response to the magnitude and sense of the movement of the control member in said angular and linear senses within said limited ranges.

12. The force sensor defined by claim 8 in which the control element includes a first spring section adapted to flex about a first axis upon the force being applied to the one end portion of the control element in response to the movement of the control member in said angular sense relative to said inner hub portion, and said first spring section being rigid about a second axis at right angles to the first axis, a second spring section adapted to flex about a third axis extending parallel to said second axis upon a force being applied to the one end portion of the control element in response to the movement of the control member in said axial sense relative to said inner hub portion, said second spring section being rigid about a fourth axis at right angles to said third axis and extending parallel to said first axis, and the stress sensor means includes stress sensor elements mounted on the first and second spring sections and responsive to the sense of the flexure of the associated spring section so as to provide the electrical signals corresponding to the magnitude and sense of the movement of the control member in said angular and axial senses relative to said inner hub portion and within said limited ranges.

13. The force sensor defined by claim 12 in which said control element includes a rigid portion intermediate the first spring section and the second spring section to operatively connect the first and second spring sections; and each of the stress sensor elements includes a stress responsive variable resistance strain gage mounted on each spring section and responsive to flexure of the associated spring section to change electrical resistance upon tensile and compressive forces being applied thereto to provide electrical signals corresponding to the forces exerted on the control element about the first and third axes upon movement of the operator-operative control member selectively in said angular and axial senses relative to said inner hub portion and within said limited ranges.

14. The force sensor defined by claim 13 in which the bearing means includes a plurality of ball bearings, an outer race surface provided in said side wall portion, and the other end portion of the control element providing an inner race surface for said ball bearings, and the other end portion of the control element being movable linearly in relation to the ball bearings of the bearing means so as to permit the nutation of the other end portion of the control element within the bearing means and in relation to the ball bearings of said bearing means in response to the magnitude and sense of the movement of the control member in said angular and linear senses within said limited ranges.

15. The force sensor defined by claim 13 in which the bearing means includes an inner bearing member having a semi-spherical bearing surface and an axial bore extending through the inner bearing member, the other end portion of the control element being positioned in slidable relation in the axial bore of the inner bearing member, an outer race member mounted in the side wall portion of the inner hub portion and having a semi-spherical socket corresponding in shape to the semi-spherical bearing surface of the inner bearing member, the inner bearing member being positioned in slidable relation in the socket of the outer race member, and the other end portion of the control element being movable linearly in the axial bore of the inner bearing member so as to permit the nutation of the other end portion of the control element within the bearing means in response to the magnitude and sense of the movement of the control member in said angular and linear senses within said limited ranges.

16. The improvement defined by claim 13 including electrical terminal panel means mounted on the rigid portion of the control element intermediate the first and second spring sections, electrical conductors leading from the stress sensor elements mounted on the first and second spring sections to the terminal panel means, an electrical connector block mounted on the base member, and other electrical conductors leading from the electrical terminal panel means to the electrical connector block for connection into an electrical control system.

* * * * *